(12) United States Patent
Winistörfer et al.

(10) Patent No.: US 11,755,005 B2
(45) Date of Patent: Sep. 12, 2023

(54) DATA DISTRIBUTION SYSTEM AND METHOD FOR A GROUP OF ELECTRONICS DEVICES

(71) Applicant: LEICA GEOSYSTEMS AG, Heerbrugg (CH)

(72) Inventors: Martin Winistörfer, Eichberg (CH); Bernd Reimann, Heerbrugg (CH); Asif Rana, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 468 days.

(21) Appl. No.: 15/959,197

(22) Filed: Apr. 21, 2018

(65) Prior Publication Data

US 2018/0307222 A1 Oct. 25, 2018

(30) Foreign Application Priority Data

Apr. 21, 2017 (EP) .................................... 17167585

(51) Int. Cl.
*G05B 23/02* (2006.01)
*H04W 4/80* (2018.01)
(Continued)

(52) U.S. Cl.
CPC ..... *G05B 23/0283* (2013.01); *G05B 23/0216* (2013.01); *G05B 23/0281* (2013.01);
(Continued)

(58) Field of Classification Search
CPC ..... G05B 23/0283; H04W 4/80; G06Q 10/02; G06F 21/10
See application file for complete search history.

(56) References Cited

U.S. PATENT DOCUMENTS 6,230,081 B1 * 5/2001 Albertshofer ........ G01C 22/004
 701/1
6,845,279 B1 * 1/2005 Gilmore ............... G05B 19/406
 70/57.1

(Continued)

FOREIGN PATENT DOCUMENTS

CN 1324024 A 11/2001
CN 1639706 A 7/2005
(Continued)

OTHER PUBLICATIONS

Stevens, TCP/IP Illustrated, vol. 1: The Protocols, Pearson Education, Inc, 3rd edition, pp. 1-963 (Year: 2012).*
(Continued)

*Primary Examiner* — Bryan Bui
(74) *Attorney, Agent, or Firm* — Maschoff Brennan

(57) ABSTRACT

A system and method for distributing data for a group of at least two electronic devices, wherein each of the devices has an electronic communication unit, each of which is designed for exchanging internal data among one another, wherein at least one of the communication units has a receiver unit which is designed for receiving external data from an external computer unit, has an arithmetic unit using an algorithm, wherein the algorithm is designed, based on the external data, to generate configuration data as internal data, and is designed to transmit the configuration data to at least one other communication unit of the system, and has a digital display device for the visual display of information for a user, wherein the display device is designed to display information which is updated based on the configuration data.

19 Claims, 9 Drawing Sheets

(51) Int. Cl.
*G06F 21/10* (2013.01)
*G06Q 10/20* (2023.01)
*G06Q 10/02* (2012.01)

(52) U.S. Cl.
CPC ............. *G06F 21/10* (2013.01); *G06Q 10/02* (2013.01); *G06Q 10/20* (2013.01); *H04W 4/80* (2018.02)

(56) References Cited

U.S. PATENT DOCUMENTS

| | | | | |
|---|---|---|---|---|
| 9,859,952 | B2* | 1/2018 | Keech | G05B 19/0423 |
| 10,437,228 | B2* | 10/2019 | Kreuzer | G05B 19/4063 |
| 2002/0064074 | A1 | 5/2002 | Kamise et al. | |
| 2004/0024849 | A1 | 2/2004 | El-Beik | |
| 2005/0137909 | A1* | 6/2005 | Tabata | G06Q 30/04 |
| | | | | 705/2 |
| 2005/0228877 | A1* | 10/2005 | Monitzer | G06F 21/6209 |
| | | | | 709/223 |
| 2006/0273918 | A1* | 12/2006 | Ram | H04M 11/002 |
| | | | | 340/679 |
| 2007/0050137 | A1 | 3/2007 | Woon et al. | |
| 2008/0294780 | A1* | 11/2008 | Lanahan | H04L 29/06 |
| | | | | 709/226 |
| 2010/0153732 | A1 | 6/2010 | Artus | |
| 2010/0299172 | A1* | 11/2010 | Nottoli | G06Q 10/06 |
| | | | | 705/7.18 |
| 2011/0043515 | A1* | 2/2011 | Stathis | G01C 15/002 |
| | | | | 434/118 |
| 2011/0238311 | A1* | 9/2011 | Kuhns | G06Q 10/06 |
| | | | | 702/1 |
| 2012/0239660 | A1* | 9/2012 | Patel | G06F 16/2272 |
| | | | | 707/741 |
| 2014/0218305 | A1* | 8/2014 | Beasley | H04M 1/7253 |
| | | | | 345/169 |
| 2014/0278555 | A1* | 9/2014 | Johnson | G06F 3/0482 |
| | | | | 705/3 |
| 2014/0323182 | A1* | 10/2014 | Kim | G06F 1/1647 |
| | | | | 455/566 |
| 2015/0102940 | A1* | 4/2015 | Keech | H04B 5/0031 |
| | | | | 340/870.02 |
| 2015/0195394 | A1* | 7/2015 | Bietz | H04M 1/7253 |
| | | | | 455/419 |
| 2015/0286209 | A1 | 10/2015 | Kreuzer et al. | |
| 2015/0308825 | A1 | 10/2015 | Dumoulin et al. | |
| 2016/0012707 | A1* | 1/2016 | McKinley | G08B 25/10 |
| | | | | 340/679 |
| 2016/0076909 | A1* | 3/2016 | Klicpera | G01F 15/066 |
| | | | | 73/198 |
| 2016/0132839 | A1* | 5/2016 | Randolph | G06F 16/9537 |
| | | | | 705/305 |
| 2017/0017305 | A1* | 1/2017 | Hur | H04M 1/72454 |
| 2017/0160712 | A1* | 6/2017 | Yun | G05D 1/0234 |
| 2018/0107178 | A1* | 4/2018 | Nixon | G06F 16/951 |
| 2018/0355638 | A1* | 12/2018 | Harring | E05B 73/0082 |

FOREIGN PATENT DOCUMENTS

| | | |
|---|---|---|
| CN | 1656479 A | 8/2005 |
| CN | 1871835 A | 11/2006 |
| CN | 101803270 A | 8/2010 |
| CN | 203911991 U | 10/2014 |
| CN | 106132639 A | 11/2016 |
| EP | 1464005 A4 | 4/2005 |
| EP | 2741049 A1 | 6/2014 |
| EP | 3 002 742 A1 | 4/2016 |
| EP | 3173736 A1 | 5/2017 |
| WO | 2013063507 A1 | 5/2013 |
| WO | 2016179271 A | 11/2016 |
| WO | 2016179271 A1 | 11/2016 |

OTHER PUBLICATIONS

Motlagh, Near Field Communication (NFC)—A technical Overview, University of Helsinki, ResearchGate, pp. 1-85 (Year: 2012).*
European Search Report dated Jun. 1, 2017 in application No. 17167585.3.
CN Search Report in Application No. 201810353119.5 dated Feb. 22, 2021.

* cited by examiner

DATA DISTRIBUTION SYSTEM AND METHOD FOR A GROUP OF ELECTRONICS DEVICES

CROSS-REFERENCE TO RELATED APPLICATIONS

This application claims priority to European Patent Application No. 17167585 filed on Apr. 21, 2017, which is incorporated herein by reference.

Field of the Invention

The present invention relates to a system and method for distributing data for a group of at least two electronic devices, in particular rented devices.

BACKGROUND

The rented equipment specifically relates to such devices as are used in the construction of buildings or other structures, for example as part of surveying tasks in the field of building installation. This comprises both devices for optical distance measurement or the acquisition of three-dimensional coordinates of remote objects such as theodolites, tachymeters, total stations, laser trackers, laser scanners or hand-held distance measuring devices, as well as rotational lasers, pipe lasers or line lasers, or cable detectors.

Such devices, in particular high-precision devices intended for professional applications, are relatively expensive to procure. It is therefore preferable not to buy expensive items of surveying equipment, but instead to rent them for limited periods during which they are needed.

As a rule, several similar or different kinds of devices are rented at the same time and for the exact same period, especially when interacting devices are involved. Interacting devices can include, for example, a laser beam projection unit and one or more receiver devices for the projected laser beam, such as described, for example, in EP 2 741 049 A1.

In addition, the above-mentioned devices often have a plurality of functions that can be activated or disabled individually, so that the same device can be rented at different prices, depending on which and how many of its functions are to be enabled for the particular customer.

In the case of a large number of rented devices the updating of rental contract-relevant data in the individual rented devices, for example, the provided configuration or the correct distribution of license keys, is a labor-intensive and error-prone task. It is therefore desirable to simplify the renting of this equipment both for the renting party and the owner.

In particular, it is desirable to display rental contract-relevant information, such as a contract number, a specified return date or the selected configuration, on each of the devices to make it easier both for the owner to issue and return the equipment, and for the renting party to use and return it. Furthermore, it would be beneficial for the owner if the devices displayed necessary maintenance dates automatically.

It would be advantageous therefore to provide a system or method that allows a simple distribution of data in a group of electronic devices, as well as allowing the display of the distributed data on the devices for a user.

Known concepts however, taken in isolation, are not designed to provide the necessary features.

For rental shops, conventional labels can currently be used. But it would be extremely costly for an owner to label the leased equipment separately with conventional labels for each rental transaction. An electronic solution with automated labels, in which the owner does not need to update the information manually when they are issued to an end customer, would therefore be advantageous due to the potential substantial time savings.

In the prior art devices known as smart labels are known, which comprise a passive RFID transponder and which are mounted, for example, together with an antenna on a film that is glued to a product. Keeping the data up to date with these solutions, however, is not only very expensive, but a further inconvenience is that data can no longer be updated while the devices are already at the customer's premises.

Furthermore, the use of electronic labels, so-called e-labels, is known, for example to indicate prices of goods on display shelves. The e-labels can be updated centrally and then show the current price for the products being displayed on the shelf. The attachment of such an e-label on movable objects is problematic, however. If the e-labels are designed to be centrally and remotely updatable, they need appropriate wireless units for receiving the data, as well as computational capacity for decryption and, if necessary, evaluation of the data. As a result, the e-labels are not only relatively large and heavy, but also consume large amounts of electric energy. Even with relatively small hand-held devices this would be very inconvenient.

SUMMARY

Therefore, an object of some embodiments of the present invention is to provide an improved system and method for distributing data in a group of electronic devices.

A further object some embodiments of is to enable the distributed data to be displayed on the devices.

A further object some embodiments of is to transmit the group data to be distributed from a remote location, for example, via an internet connection.

A further object some embodiments of is to facilitate a completeness check of the devices belonging to the group.

A further object is to provide such a system and method, which makes it easier to rent the group of devices, in particular the time taken to reconfigure them being reduced.

A further object is to increase the operational efficiency, in particular by reducing the risk that incorrect or incorrectly configured devices are issued and used.

A further object some embodiments of is to provide such a system at low cost and with minimal design effort.

A further object some embodiments of is to provide such a system in a way that enables it to be used even in small devices and devices with low memory and processing power, and in particular without adversely affecting the functionality of these devices, and which does not make hand-held devices difficult to handle.

At least one of these objects is achieved by the implementation of the characterizing features of the independent claims. Advantageous configurations of the invention can be found in the respective dependent claims.

A first aspect of some embodiments of the present invention relate to a system for distributing data for a group of at least two electronic devices, wherein each of the devices has an electronic communication unit, wherein the communication units are each designed to exchange internal data among one another.

In accordance with this aspect of the invention, at least one of the communication units has a receiving unit which is designed to receive external data from an external computer unit. At least one of the communication units—either the same one that also has the receiving unit or a different one—has an arithmetic unit with an algorithm, wherein the algorithm is designed, based on the external data, to generate configuration data as internal data, and is designed to transmit the configuration data to at least one other communication unit of the system. At least one of the communication units also has a digital display device for the visual display of information for a user, wherein the at least one display device is designed to display information which is updated based on the configuration data.

In accordance with an embodiment of the system, the communication units are designed to exchange the internal data among each other using Near Field Communication, in particular wherein each of the communication units has an RFID module.

Alternatively, the communication units can be designed to exchange the internal data with each other by means of a wireless connection, such as Bluetooth or Zigbee.

According to a further embodiment, the receiving unit is designed as a wireless receiver unit for receiving the external data over a mobile wireless network.

In accordance with another embodiment the receiving unit is designed as an LPN receiver unit (LPN=Low Power Network) for receiving the external data via a low-power network, in particular, LoRa or SigFox.

In accordance with another embodiment the receiver unit is designed to detect requests from the external computer unit.

According to a further embodiment, the external data have one or more license keys for the at least two electronic devices.

In accordance with another embodiment, the external data is encrypted, and the arithmetic unit has an algorithm which is designed to decrypt the external data.

In one embodiment of the system, the at least two electronic devices are intended to be used jointly, and in particular to interact operationally.

In one embodiment of the system, at least one of the communication units has a control unit, which is designed for controlling the corresponding electronic device based on the configuration data. The control comprises, in particular, activation or de-activation of the functions of the device.

According to a further embodiment, one of the communication units comprises both the receiver unit and the arithmetic unit and is designed to transmit the update data to the at least one other communication unit.

In accordance with another embodiment, a first communication unit comprises the receiver unit, and a second communication unit comprises the arithmetic unit and is designed to transmit the update data to at least the first communication unit, wherein the first communication unit is designed to transmit the external data to the second communication unit.

According to a further embodiment, at least one of the communication units is designed to detect data of at least one device of the group at defined intervals, in particular of a plurality of devices or all the devices in the group.

In one embodiment the corresponding communication unit then comprises an algorithm, which is designed to create a usage profile of the device or the group from the usage data and, based on the usage profile, to present a suggestion to a user of functions that can be activated for the at least one device on a display device. Alternatively, the corresponding algorithm can also be provided externally on a server or in a cloud, wherein the communication unit provides the usage data to the algorithm. In turn, the communication unit can obtain the usage profile and/or the suggestion of activatable features, in order to present the latter to a user on the display device.

According to a further embodiment the internal data comprise maintenance data with information about a maintenance date of at least one device of the group, and the display device of the at least one device is designed to display the maintenance date.

In one embodiment at least one of the communication units has a statistical unit with an algorithm, which is designed to calculate the maintenance date of at least one device of the group based on usage data of the at least one device.

In another embodiment, at least one of the actual communication units is designed for sending usage data of the at least one device to the external computer unit, the external data comprise information about the maintenance date, and the algorithm of the arithmetic unit is designed to generate the maintenance data based on the external data.

According to a further embodiment, at least one of the communication units has a data memory and is designed to acquire or retrieve information about devices of the group, to store acquired or retrieved information in the data memory, and to display the information to a user on the display device. The information about a device comprises, for example, information about a location, activated functions and/or a battery status of the device.

According to a further embodiment, at least one of the communication units is designed to detect the other communication units to which current configuration data have already been transmitted, and to display to a user on the display device, the communication units of the devices to which the current configuration data are yet to be transmitted.

According to a further embodiment, at least one of the devices of the group is a laser beam projection device, such as a rotating laser, a pipe laser or line laser. In particular, at least one of the other devices is designed to receive a laser beam of the laser beam projection device.

According to a further embodiment, the group comprises at least one protective container, which has an internal space that is designed for receiving at least one of the electronic devices. The protective container also has a digital display device and a communication unit. This display device is provided on an outer shell of the protective container, and the communication unit of the protective container is designed as an internal space communication unit for communicating with communication units of electronic devices located in the internal space.

A second aspect of some embodiments of the present invention relate to a method for updating data of a group of at least two electronic devices, wherein each of the devices has an electronic communication unit, and the communication units are each designed to exchange internal data among one another. The method comprises receiving external data from an external computer unit by a receiver unit of one of the communication units;

generating, based on the external data, configuration data as internal data by means of an algorithm of an arithmetic unit of one of the communication units;

transmitting the configuration data to at least one other communication unit of the system; and displaying information, which is updated based on the configuration data, on a display device of at least one of the communication units.

According to one embodiment, the method also comprises a decryption of external data transmitted in encrypted form, by an algorithm of the arithmetic unit.

According to a further embodiment, the method also comprises an—at least partial—control of at least one electronic device of the group by the corresponding communication unit based on the configuration data, in particular wherein this control comprises at least one activation or deactivation of functions of the device.

BRIEF DESCRIPTION OF THE DRAWINGS

The system according to the invention and the method according to the invention are described below on the basis of specific exemplary embodiments shown schematically in the drawings purely by way of examples, wherein further advantages of the invention will also be discussed. Individually, they show.

DETAILED DESCRIPTION

Figure 1:
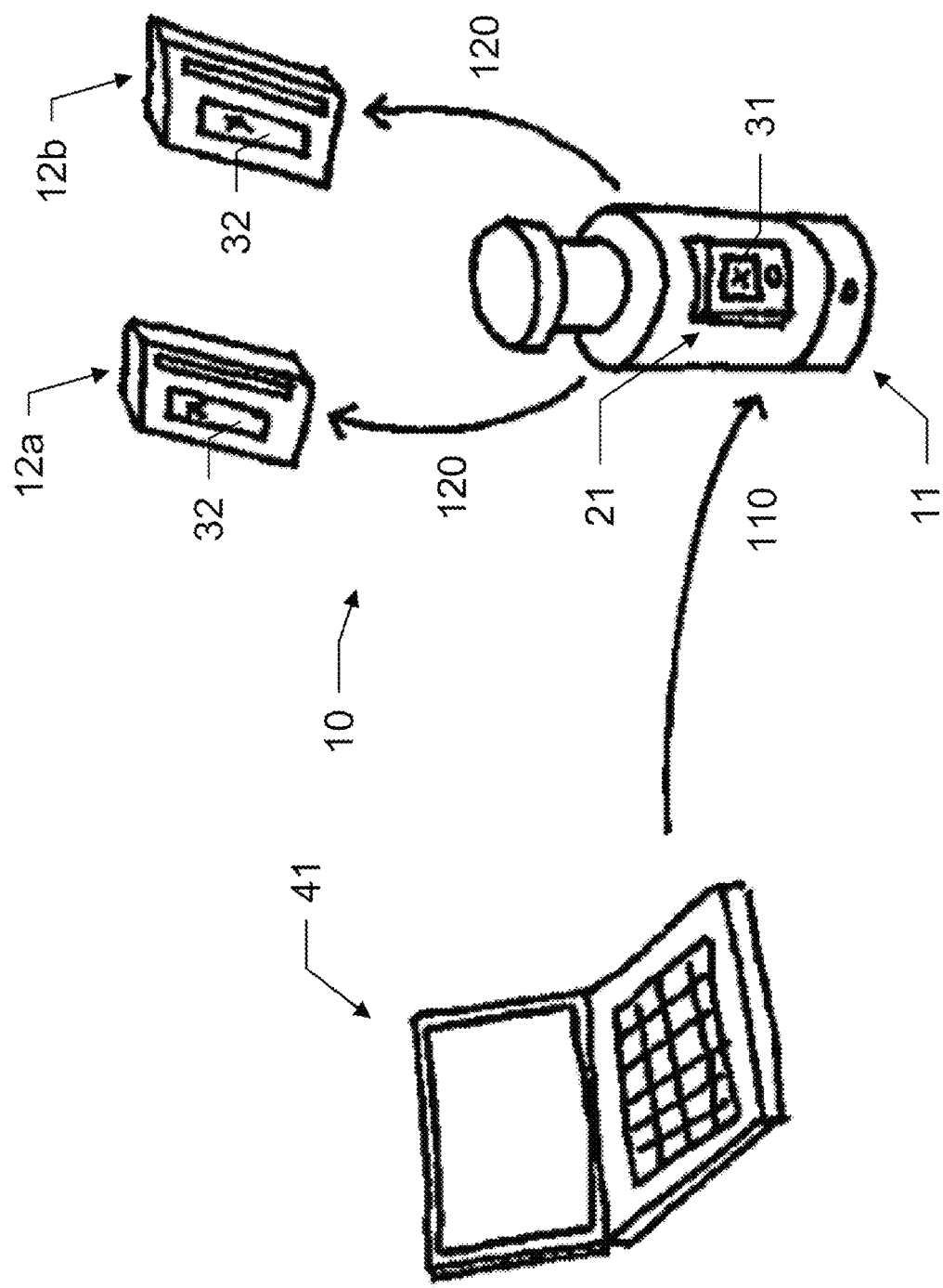
FIG. 1 a first exemplary embodiment of a data distribution system for a group of rented devices.

FIG. 1 illustrates a first exemplary embodiment of a data distribution system for a group 10 of electronic devices. In the example shown, these include a laser beam projection device 11 used in the construction industry, as well as two interacting identical laser beam receiving devices 12a, 12b which interact with the former.

Each of the devices 11, 12a, 12b has a display unit 31, 32, which can be designed, for example, as an LCD display, touchscreen or E-paper. Different product information can be presented on these displays. This comprises, among other things, a product name, serial, customer or rental contract number, return date and location, as well as selected, i.e. activated, functions of the device. This feature reduces errors, for example, in the issuing or return of rented equipment or the correct configuration of the devices in accordance with the customer's wishes.

From a computer 41, data that are to be displayed on each of the devices of the group are transmitted to the group.

In accordance with the invention, this information is not transmitted to each individual device. As shown in FIG. 1, a first device, in this case the projection device 11, has a first communication unit 21 with a display unit 31. The data are transmitted by the computer 41 to this first communication unit 21 only (arrow 110). The first communication unit 21 modifies the data, for example, the data are decrypted and matched with data already saved. They are then displayed on the display unit 31 and then forwarded to the other devices 12a,b (arrow 120), e.g. by means of wireless or Near Field Communication, where the data are then also displayed on their display units 32.

In practice the data distribution according to FIG. 1, for example, functions as follows: a renter of the device group 10 shown, consisting of laser beam projection device 11 and two receiver devices 12a, 12b, acquires new functions (licenses) for the rented devices using a software package installed on his/her PC 41. The software loads the corresponding licenses via the Internet onto the PC 41 and then transmits them to the communication unit 21 of the laser beam projection device 11—for example, using WLAN or Bluetooth, and preferably in encrypted form. As soon as the communication unit 21 receives the data, these are decrypted and evaluated, and the desired functions of the laser beam projection device 11 are enabled. As soon as one of the receivers 12a connects to the projection device 11, the latter's communication unit 21 checks the configuration stored in the communication unit of this receiving device 12a and updates it. The display unit 32 then displays data updated according to the new configuration.

This data distribution occurs each time when the configuration is to be changed. As a result, the displayed information is kept updated dynamically, and is changed as soon as functions are enabled or disabled. In addition to the functions, the updated information can also comprise static information, such as a product name or a serial number, as well as rental contract-relevant data (e.g. agreed return location and date, or the renter's name), group-related data (such as names or serial numbers of the devices rented together) or maintenance-relevant data (e.g. the next maintenance date or a battery status).

All or part of this information will be distributed in the corresponding group 10 of devices, so that consistent data can be displayed on each device.

Alternatively, the data can be displayed only on individual devices in the group. Also, the group 10 can have a special input and output device, which is designed to be worn or carried by a user and which has a communication unit with display unit, and input means for the user, such as a keypad or a display unit designed as a touchscreen. In particular, such a device can be designed as a wearable, e.g. as a smart watch, VR-glasses or an E-garment, or as a smartphone or hand-held distance meter.

Figure 2:
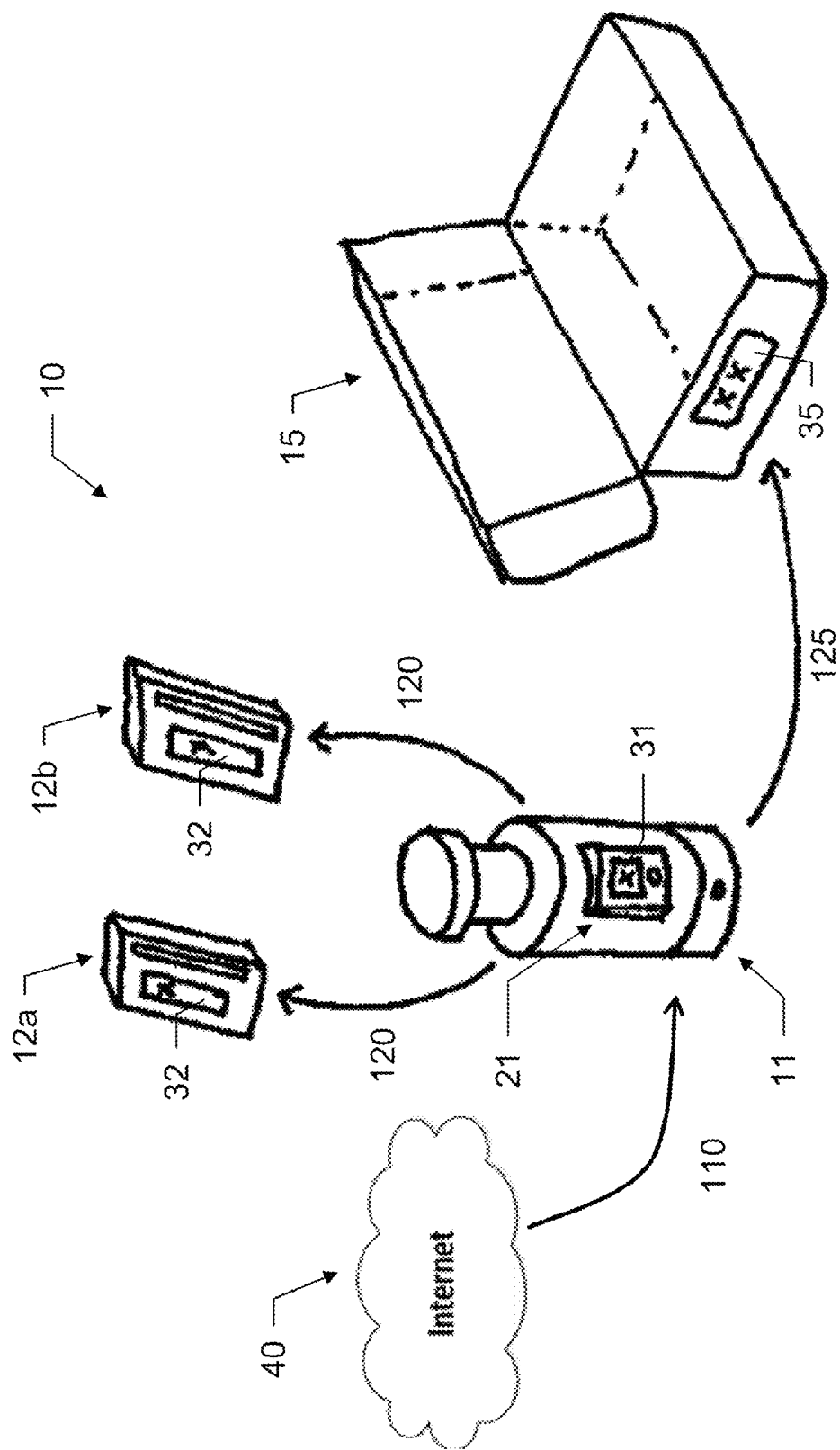
FIG. 2 a second exemplary embodiment of a data distribution system for a group of rented devices.

FIG. 2 shows a second exemplary embodiment of the data distribution system. In this case, the external data from the internet are transmitted 110 to the communication unit 21, for example, over a WLAN or a mobile wireless network, and forwarded 120 to the other devices 12a,b as described in FIG. 1.

The device group 10 here additionally comprises a protective container 15. Various designs of such a protective container, which are also possible here, are described, for example, in European patent application 15196101.8. The protective container has a display unit 35 on its outer shell. The first communication unit 21 can transmit 125 the data to the protective container 15 to be displayed on this display unit 35. This can be done by means of Near Field Communication, for example, if the projection device 11 is located in the protective container 15. Additional data from devices located in the protective container 15 can also be transferred to this, which means they can be displayed to a user on the display unit 35 even if the container 15 is closed.

Figure 3A:
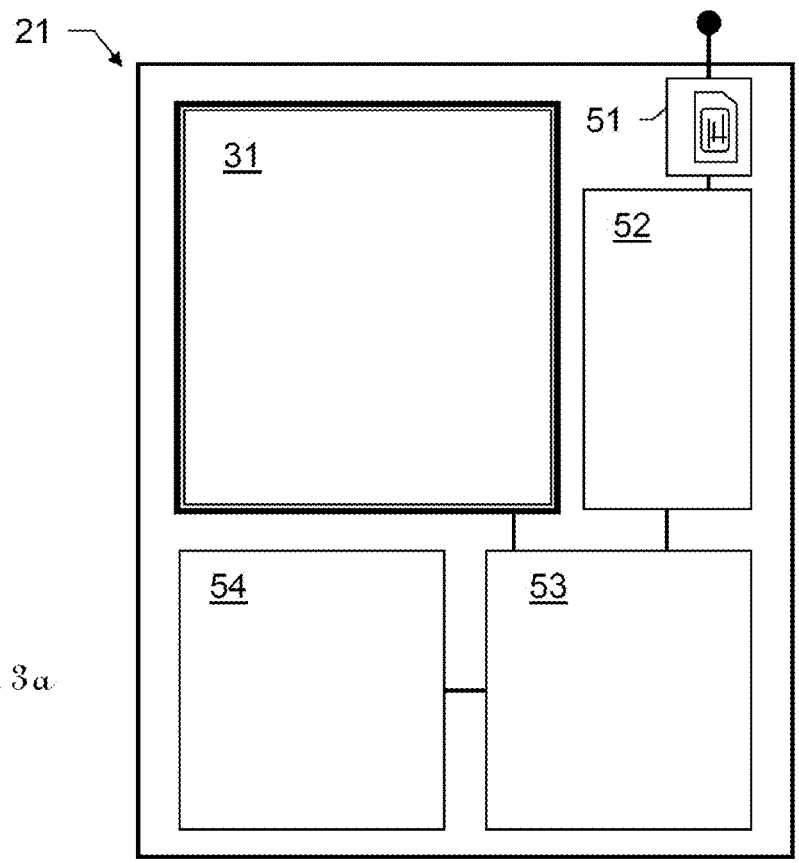
FIG. 3a-b exemplary embodiments of a first and a second communication unit.
Figure 3B:
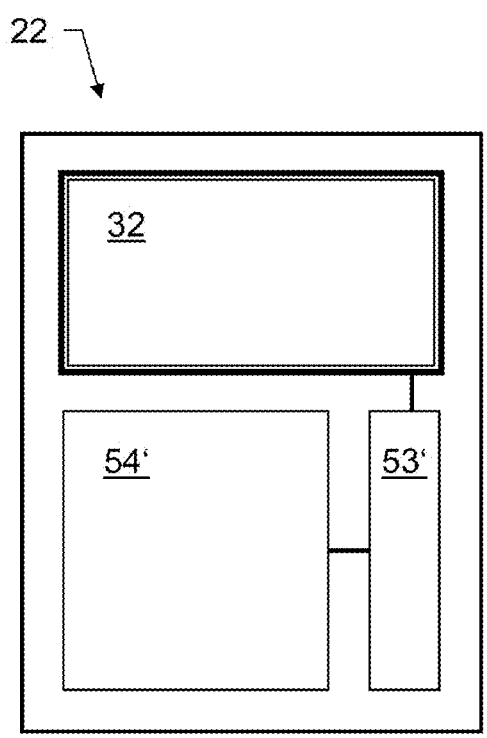

FIGS. 3a and 3b show a schematic representation of two interacting communication units 21,22, purely as examples. FIG. 3a shows a first communication unit 21 of the first device 11 from FIGS. 1 and 2. This has a display unit 31, which can be configured, for example, as an LCD display, touchscreen or E-ink display and used for displaying data to a user of the device. The unit 21 also has a receiver unit 51 for receiving external data. Here the receiver unit 51 is designed as a wireless receiver unit with a SIM card for receiving the data over a wireless network. The data received in this way are forwarded to an arithmetic unit 52, in which the external data are converted into internal data. For this purpose, the arithmetic unit 52 has a circuit and an algorithm which are designed to generate, based on the external data, configuration data as internal data, for which purpose, for example, the external data are decrypted, decompressed, reformatted and/or aligned and merged with locally stored data. In a storage unit 53 of the communication unit 21, for example, a storage module or a solid-state drive, both local data as well as the external and transformed data can be stored.

According to this embodiment, the communication unit 21 has a Near Field Communication device 54, which is designed for exchanging data with corresponding devices of other communication units. In particular, in this way, the configuration data can be transmitted to other communication units.

FIG. 3b shows such a second communication unit 22. This has a Near Field Communication device 54', designed to receive data of the corresponding device 54 of the communication unit 21 from FIG. 3a, as well as a display unit 32 for presenting information based on the received data.

In contrast to the first communication unit 21, shown in FIG. 3a, the one shown here has neither a receiver unit nor an arithmetic unit. The storage unit 53' can also be designed smaller in this case, which is why this communication unit 22 is significantly smaller in size and can also fit on or in correspondingly smaller devices.

Alternatively, communication devices can be provided that are designed for exchanging data via wireless links, for example, using Zigbee, Z-Wave or Bluetooth.

Figure 4:
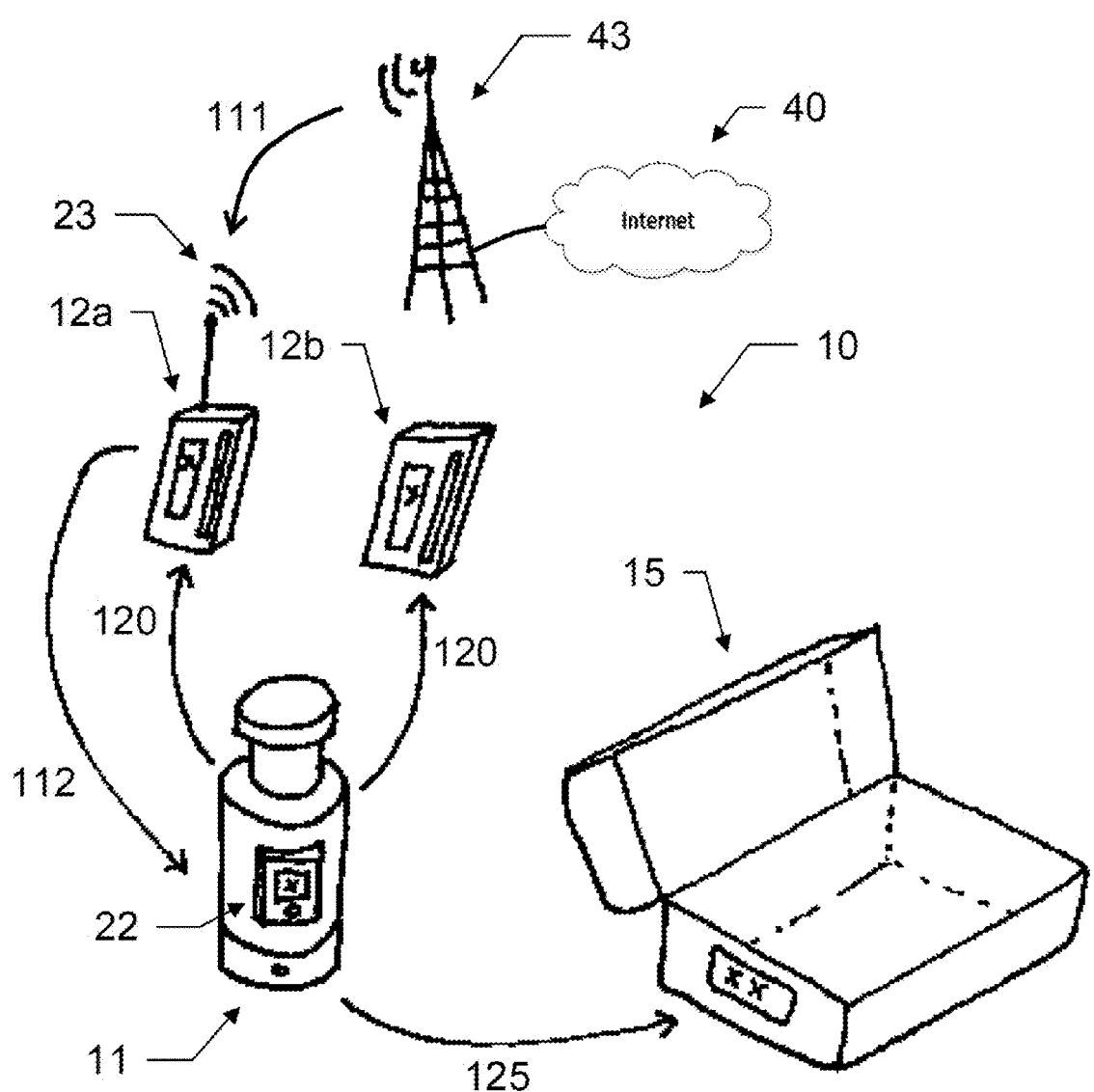
FIG. 4 a third exemplary embodiment of a data distribution system for a group of rented devices.

FIG. 4 shows a third exemplary embodiment of the data distribution system. In this case, the external data are transmitted (arrow 111) over the internet 40 via a wireless network (wireless system 43), but in contrast to the embodiments of FIG. 1 and FIG. 2 not to the projection device 11, but to the laser beam receiver device 12a which is equipped with a communication unit 23 with a wireless radio receiver unit. This communication unit 23 in this example does not have an arithmetic unit, this being provided instead in the communication unit 22 of the projection device 11. The unprocessed data are therefore first forwarded to this communication unit 22 (arrow 112). There, the data are modified and, as described in FIGS. 1 and 2, forwarded to the other devices 12a,b and the protective container 15 (arrows 120, 125).

In practice the data distribution according to FIG. 4, for example, functions as follows: a renter of the device group 10 shown, consisting of a laser beam projection device 11, two receiver devices 12a, 12b and protective container 15, acquires new functions (licenses) for the rented devices via an interface of the communication unit of one of the devices, here the receiver device 12a. The communication unit 23 of this communication unit loads the corresponding licenses via a mobile wireless link and the internet onto the receiver device 12a and then transmits them to the communication unit 21 of the laser beam projection device 11—for example, by means of wireless or near field communication. As soon as the communication unit 21 receives the data, these are decrypted and evaluated, and the desired functions of the laser beam projection device 11 are enabled. As soon as one of the receivers 12a, 12b connects to the projection device 11 (receiving device 12a is normally also connected), the latter's communication unit 21 checks the configuration stored in the communication unit of this receiving device 12a and updates it. The display unit 32 then displays data updated according to the new configuration.

If the protective container 15 with the projection device 11, or its communication units, are connected to each other, the stored configuration is checked here also and updated. The display unit 35 of the protective container 15 then also displays the updated data. The connection of the projection device 11 to the protective container 15 can be carried out both manually and automatically.

Figure 5:
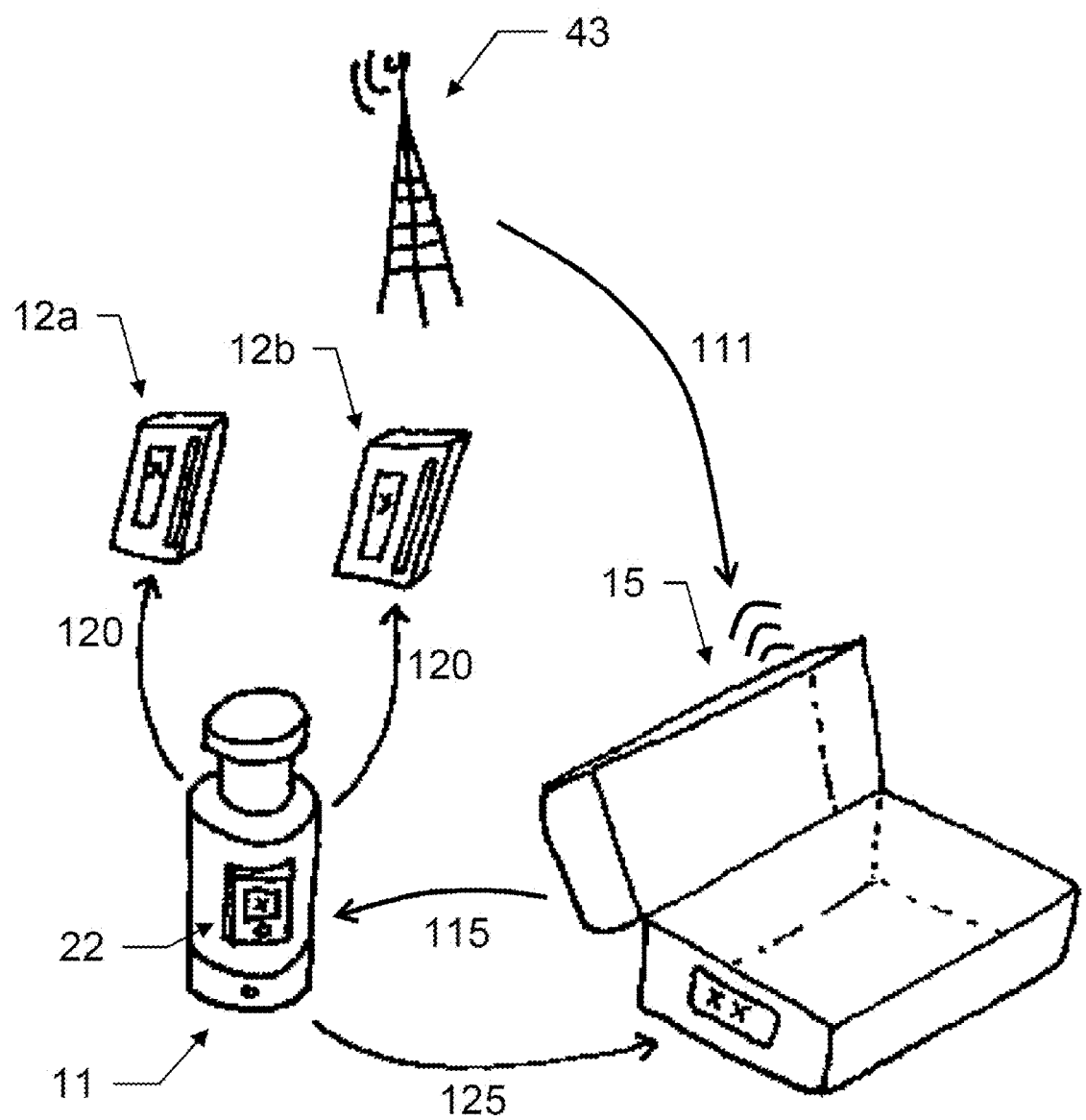
FIG. 5 a fourth exemplary embodiment of a data distribution system for a group of rented devices.

FIG. 5 shows a fourth exemplary embodiment of the data distribution system. As shown in FIG. 4, the external data are transmitted (arrow 111) over the internet and a wireless network (wireless system 43), but in contrast to the embodiments of FIG. 4 not to the laser beam receiver device 12a, but to the protective container 15 which is equipped with a communication unit with a wireless radio receiver unit. The unprocessed data here are also forwarded (arrow 115) to the communication unit 22 of the projection device 11, where they are processed and then forwarded (arrows 120, 125) to the other devices 12a,b and the protective container 15.

Alternatively, the protective container 15 can of course also have a communication unit with the functions shown in FIG. 3a.

Figure 6:
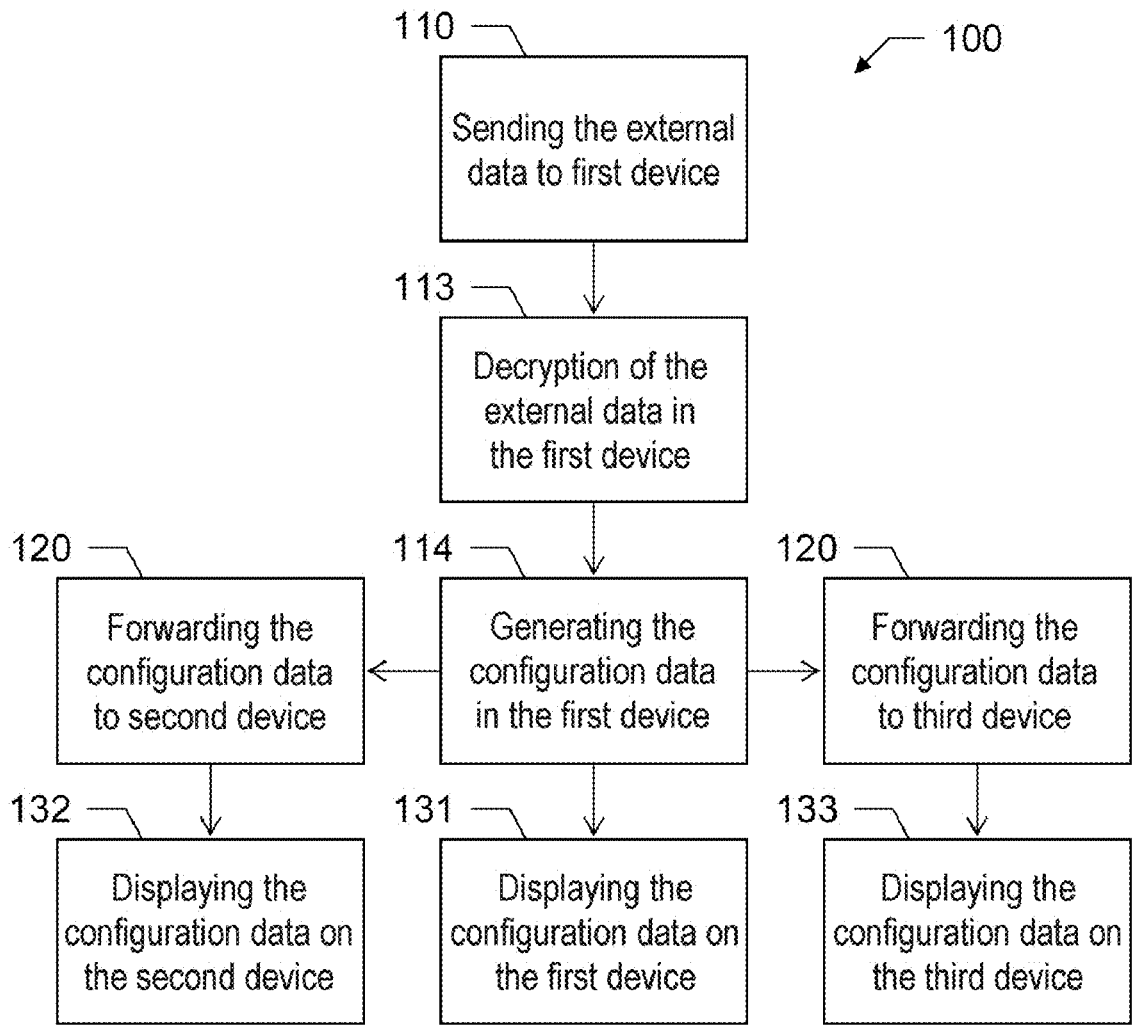
FIG. 6 a flowchart illustrating a first exemplary embodiment of a data distribution method.
Figure 7:
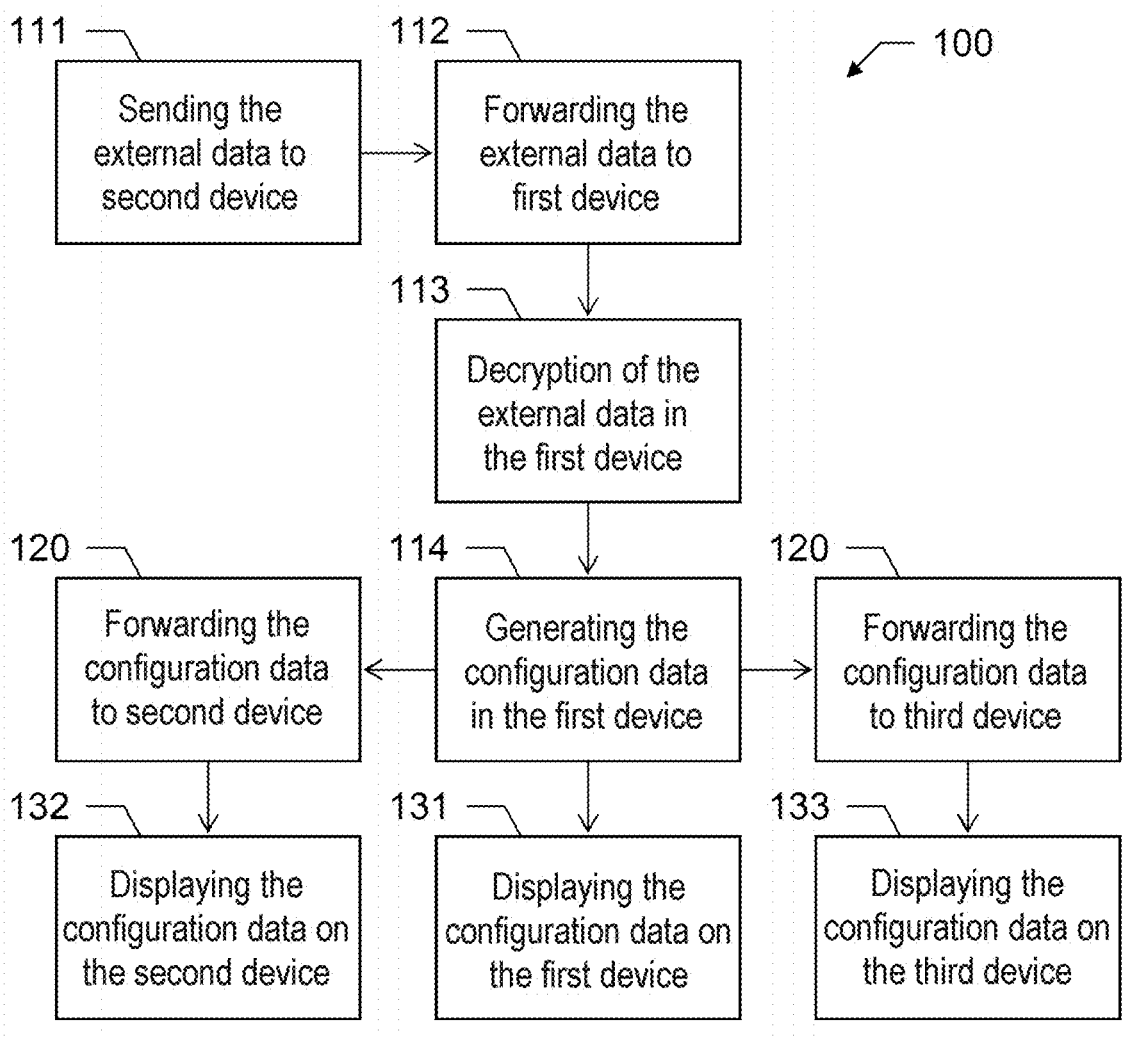
FIG. 7 a flowchart illustrating a second exemplary embodiment of a data distribution method.
Figure 8:
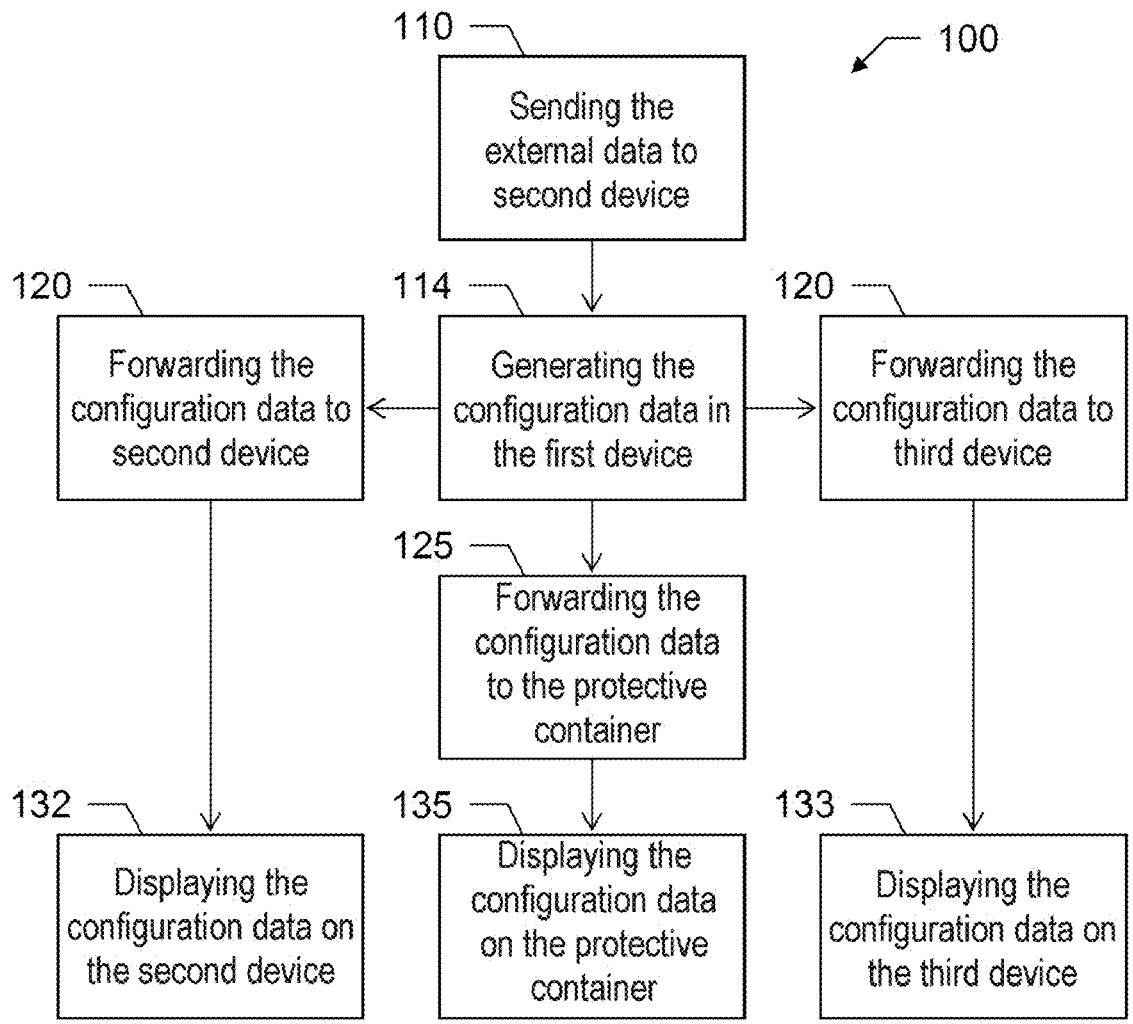
FIG. 8 a flowchart illustrating a third exemplary embodiment of a data distribution method.

FIGS. 6 to 8 illustrate various exemplary embodiments of a method according to the invention based on flowcharts.

FIG. 6 shows a first exemplary embodiment of the method. This method 100 is started, in particular, by a user of a group of devices performing a function that requires an update of data on the devices. The user can, for example, activate new functions for a group of rented devices—either by means of software on a PC or directly on one of the devices. This leads to the first step 110 of the method, in which the data necessary for the update are transmitted to the communication unit of a first device. These data can comprise, for example, license keys to activate the features in the devices. The data are transferred as soon as the communication unit is ready to receive.

Since the data are preferably sent in encrypted form, in the next step 113 the necessary decryption of the external data is performed in the communication unit. Then in the next step 114, the external data in the communication unit are converted if necessary into internal configuration data, which can be evaluated by the devices.

For example, the configuration data can then be used directly for activating the desired functions in the first device. In addition, in step 131 the configuration data or information based thereon is displayed on a display unit of the communication unit.

As soon as the communication unit of the first device picks up a connection with the communication units of other units of the group, the configuration data in step 120 are transmitted to the respective communication units. In particular, Near Field Communication may be used for this purpose, wherein the communication units each have an RFID module.

As soon as a further communication unit has received the configuration data, these data, or information based thereon, are displayed in step 131, 132 on a display unit of the respective communication unit. For example, they are also used to activate the desired functions in the other devices as well.

FIG. 7 shows a second exemplary embodiment of the method. In contrast to the method shown in FIG. 6, in this method 100 in step 111 the external data are not sent to the first device, but to a second one. From this, in step 112 the data are forwarded to the first one, where as described in FIG. 6, they are decrypted (step 113) and can be used to generate the configuration data (step 114). From the first device, the configuration data are then transferred back to the second device (step 120), among other things.

FIG. 8 shows a third exemplary embodiment of the method. In contrast to the device shown in FIG. 6, here the first device is located in a protective container. In step 110, the necessary data for updating are transmitted to the communication unit of the first device, where the configuration data are generated in step 114. Since the first device is located in the protective container, information based on the configuration data can indeed be displayed on the device itself, but are only visible to the user after opening the container. The configuration data are therefore advantageously transmitted in the next step 125 to a communication unit of the protective container, in particular by means of Near Field Communication, so that the information in step 135 is displayed on a display unit of the protective container. The configuration data are also transmitted to the other devices in step 120. If they are located outside the protective container, the data can be transferred via an external communication unit of the protective container, and can then be displayed on the second and third device (steps 132, 133). If the other devices are also in the protective container, the data can also be transferred directly using Near Field Communication by the communication unit of the first device. In addition or as an alternative to being displayed on the devices which are inside the container and not visible to the user, the data can be transferred to the protective container to be displayed on the display unit thereof.

Figure 9:
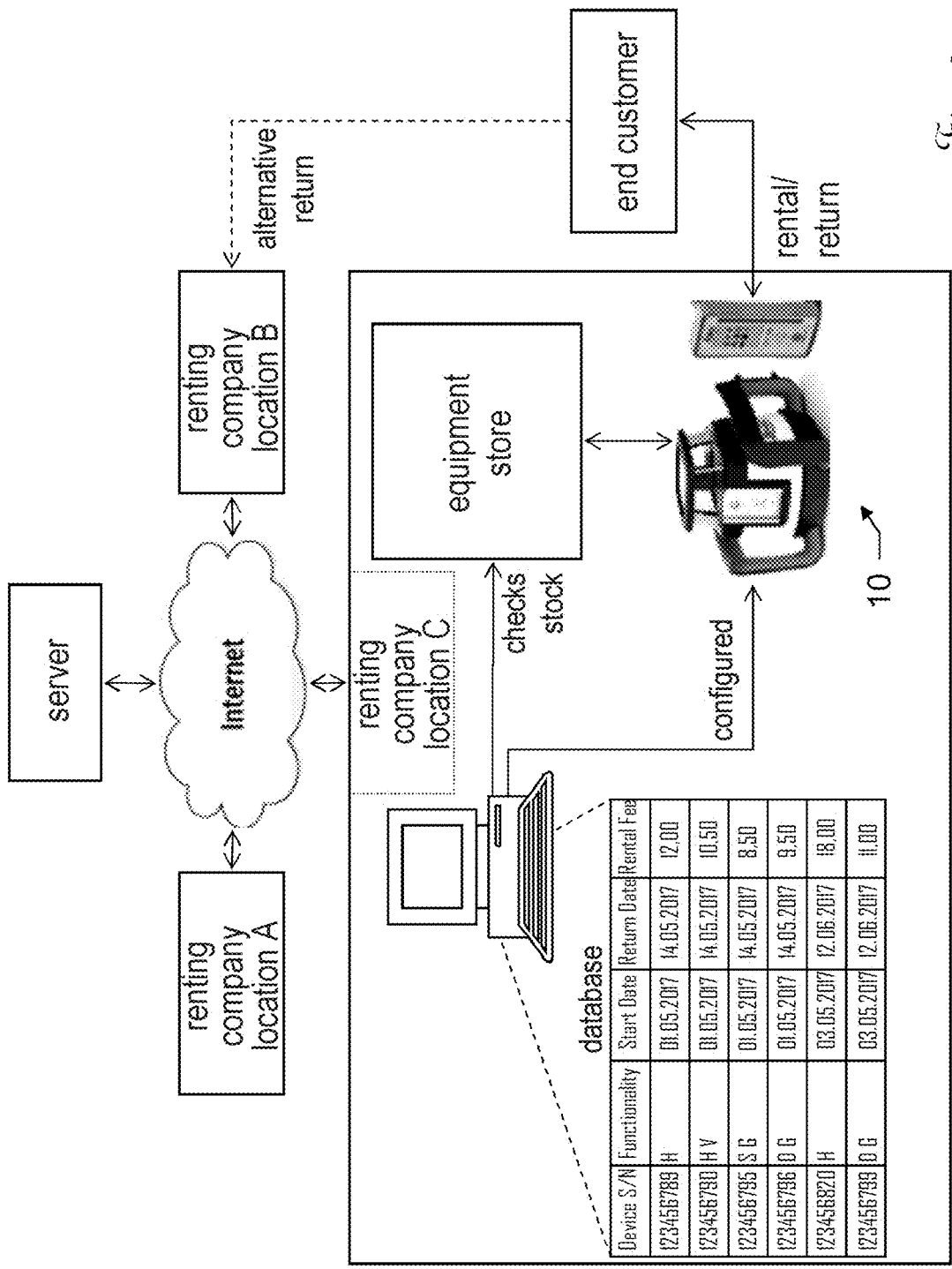
FIG. 9 illustrates a server-side component of an exemplary embodiment of a data distribution method, on the basis of an application example.

FIG. 9 schematically illustrates an application example of an embodiment of the method and system according to the invention. The figure shows the infrastructure of a rental company with multiple locations A, B, and C. Each of the sites is connected to a server via the internet and can access its data. This can be either a server of the rental company itself or, for example, belong to the manufacturer or distributor of the devices available for rent.

At the site C of the rental company an end user rents a group 10 of devices which are available in the store of site C, and orders a specific configuration. This is entered in a database of a local personal computer, whereupon the license keys corresponding to the rented equipment and to the configuration that was ordered are retrieved from the server via the internet. The devices of the group 10 are then configured, i.e. the license keys and any other configuration data are transmitted to the devices. This takes place as described above, preferably by transferring the data to the communication unit of a main device.

The other configuration data in particular comprise rental contract-relevant data, for example on the renting party, the owner, rental period and rented group of devices 10 (e.g. number and identity of all devices in the group).

At the time of transfer to the customer the devices already display information relevant to the configuration data, so that the risk of errors is significantly reduced.

The customer accepts the devices and uses them in accordance with the contract. As described above, the configuration data can also be updated on site (e.g. via a mobile wireless connection), for example, if other functions of the devices are to be activated or the rental period is to be extended.

The return takes place at site C again or at another location of the rental company. Using the information displayed on the devices, the risk of errors is also significantly reduced upon the return.

In order to solve the potential problem that a user may not know about certain functionalities of the devices in the device group, even though they are available or could be activated, in one embodiment of the system at least one of the communication units of the group is designed to acquire usage data of at least one device of the group. These can include, for example, acceleration or localization data of the devices, as well as usage times and functionalities used.

The corresponding communication unit also comprises an algorithm which is designed to create a usage profile based on the acquired usage data and which based on this data, automatically suggests appropriate functions to the user, which can then be activated directly by the user. A suggestion for features that are available to be activated can, in particular, be presented on one of the display devices. This allows time savings and prevents unnecessary exchange of devices.

In addition, the algorithm can be designed to find out whether a device from the group already possesses or supports a specific functionality. If the user requires a certain functionality on a construction site that none of the available devices can provide, then using this algorithm a location of another device on the same construction site that does provide the function can be displayed on the display unit. This means the user has, for example, an older device which does not support a certain new feature. The user can then identify possible functions of other devices on the construction site (for example, with the aid of a map on the display), or find where there is a device with the appropriate functions which are not available in the device that the user has available (i.e. in particular, is currently holding in their hand), or in the associated device group. For example, the user can then automatically create a reservation for the required device or device group.

Alternatively, the algorithms can be provided either completely or partly externally, in particular on a server or in a cloud, wherein the data are transferred by means of the receiver unit, for example, over the Internet.

It goes without saying that these figures shown only represent possible exemplary embodiments in a schematic way. The different approaches can also be combined equally well with each other as with methods from the prior art.

What is claimed is:

1. A system for distributing data, the system comprising:
  a group of at least two electronic devices, which are configured to be used for the construction of buildings or other structures as part of surveying tasks in the field of building installation, wherein the group of at least two electronic devices includes devices for optical distance measurement or the acquisition of three-dimensional coordinates of remote objects, wherein the at least two electronic devices are optionally selected from the group of theodolites, tachymeters, total stations, laser trackers, laser scanners, hand-held distance measuring devices, rotational lasers, pipe lasers, line lasers, or cable detectors, wherein the at least two electronic devices are configured to be used jointly and to operationally interact, and wherein each of the at least two electronic devices has an electronic communication unit designed for exchanging internal data between the at least two electronic devices, wherein:
  a first electronic communication unit of the electronic communication units comprises a receiver unit configured to receive external data from an external computer unit, wherein the external data comprise license-related data for the at least two electronic devices;

the first electronic communication unit or a second electronic communication unit of the electronic communication units comprises an arithmetic unit with an algorithm, wherein the algorithm is designed to generate configuration data based on the external data as internal data, and is designed to transmit the configuration data to at least one other electronic communication unit of the system;

one or more of the electronic communication units comprise a digital display device for a visual display of information for a user, wherein the display device is designed to display updated information based on the configuration data; and each of the at least two electronic devices comprises a plurality of functions that can be activated and deactivated individually, wherein at least the second electronic communication unit comprises a control unit that is designed for controlling the corresponding electronic device based on the configuration data, said controlling including at least one of activating or deactivating individually a subset of functions of the plurality of functions of the electronic device based on the configuration data, wherein the external data are encrypted, and the arithmetic unit comprises an algorithm configured to decrypt the external data.

2. The system according to claim 1, wherein each electronic communication unit is configured to exchange the internal data among one another using near field communication.

3. The system according to claim 1, wherein the receiver unit is configured as a mobile wireless receiver unit for receiving the external data over a wireless network.

4. The system according to claim 1, wherein the external data comprise license keys for the at least two electronic devices.

5. The system according to claim 1, wherein the first electronic communication unit comprises both the receiver unit and the arithmetic unit and is designed to transmit the configuration data to at least the second electronic communication unit.

6. The system according to claim 1, wherein the second electronic communication unit comprises the arithmetic unit and is designed to transmit the configuration data to at least the first electronic communication unit, wherein the first electronic communication unit is designed to transmit the external data to the second electronic communication unit comprising the arithmetic unit.

7. The system according to claim 1, wherein at least one of the electronic communication units is configured to acquire usage data of at least one device of the group of at least two electronic devices at defined intervals.

8. The system according to claim 7, wherein:
the internal data comprises maintenance data with information about a maintenance date of at least one device of the group of the at least two electronic devices, and the display device of the at least one device is designed to display the maintenance date,
wherein at least one of the electronic communication units comprises a statistics unit with an algorithm that is configured to calculate the maintenance date of at least one device of the group of the at least two electronic devices based on the usage data of the at least one device.

9. The system according to claim 7, wherein the internal data comprises maintenance data with information about a maintenance date of at least one device of the group of the at least two electronic devices, and the display device of the at least one device is designed to display the maintenance date,
wherein at least one of the electronic communication units is configured to send the usage data of the at least one device to the external computer unit, the external data comprises information about the maintenance date, and the algorithm of the arithmetic unit is designed to generate the maintenance data based on the external data.

10. The system according to claim 1, wherein at least one of the electronic communication units has a data memory and is configured to:
acquire or retrieve information about devices of the group of at least two electronic devices,
store acquired or retrieved information in the data memory, and
display the information to a user on the display device.

11. The system according to claim 1, wherein at least one of the electronic communication units is configured to:
detect other electronic communication units to which current configuration data have already been transmitted; and
display to a user on the display device, the electronic communication units of the devices to which the current configuration data are yet to be transmitted.

12. The system according to claim 1, wherein the group of at least two electronic devices comprises at least one protective container, which has an interior space that is designed for receiving at least one of the electronic devices, wherein:
the protective container has a digital display device on an outer shell of the protective container; and
an electronic communication unit of the protective container is configured as an interior-space electronic communication unit for communication with electronic communication units of electronic devices located in the interior space.

13. The system according to claim 1, wherein at least one of the devices of the group of at least two electronic devices is a laser beam projection device, and
wherein at least one other of the devices is designed to receive a laser beam of the laser beam projection device, wherein the at last two electronic devices are used jointly and operationally interact with each other.

14. The system according to claim 13, wherein a first laser beam receiving device comprises a first electronic communication unit, and the laser beam projection device comprises a second electronic communication unit,
wherein the first electronic communication unit comprises the receiver unit, and the second electronic communication unit comprises the arithmetic unit and is designed to transmit the configuration data at least to the first electronic communication unit,
wherein the first electronic communication unit is designed to transmit the configuration data to the second electronic communication unit.

15. The system according to claim 1, wherein the receiver unit is configured as an Low Power Network (LPN) receiver unit for receiving the external data via a low-power network.

16. The system according to claim 1, wherein the configuration data comprises license keys for the activation or deactivation of functions of the plurality of functions of the electronic device.

17. The system according to claim 1, wherein:
the at least two electronic devices are rented devices,
the configuration data comprise rental contract-relevant data regarding at least one of rental company, owner, product name, serial number, customer number, rental contract number, rental period, return date, return location, number and identity of the rented devices, and activated and deactivated functions of the rented devices,
the contract-relevant data can be accessed from a server and displayed to the user by the display device.

18. A method for updating data of a group of at least two electronic devices, which are configured to be used for the construction of buildings or structures as part of surveying tasks in the field of building installation, wherein the group of at least two electronic devices includes devices for optical distance measurement or the acquisition of three- dimensional coordinates of remote objects, wherein the group of at least two electronic devices is optionally selected from the group of theodolites, tachymeters, total stations, laser trackers, laser scanners, hand-held distance measuring devices, rotational lasers, pipe lasers, line lasers, or cable detectors, wherein each of the at least two electronic devices has an electronic communication unit designed for exchanging internal data among one another, wherein each of the at least two electronic devices comprises a plurality of functions that can be activated or disabled individually, the method comprising:
receiving external data from an external computer unit by a receiver unit of a first of the electronic communication units, wherein the external data comprise license-related data for the at least two electronic devices;
generating, based on the external data, configuration data as internal data by means of an algorithm of an arithmetic unit of the first or a second of the electronic communication units wherein the external data are encrypted, and the arithmetic unit comprises an algorithm configured to decrypt the external data;
transmitting the configuration data to at least one other electronic communication unit of the system;
displaying information, which is updated based on the configuration data, on a display device of at least one of the electronic communication units; and
controlling, based on the configuration data, at least one electronic device of the group by the corresponding electronic communication unit, said controlling including at least one of activating or deactivating individually a subset of functions of the plurality of functions of the electronic device based on the configuration data.

19. A system for distributing data, the system comprising:
a group of at least two electronic devices comprising a laser beam projection device and at least one laser beam receiver device that is designed to receive a laser beam of the laser beam projection device, wherein the at least two electronic devices are configured to be used jointly in the construction of buildings or other structures as part of surveying tasks in the field of building installation, each of the at least two electronic devices comprising a plurality of functions that can be activated and deactivated individually,
wherein each of the at least two electronic devices has an electronic communication unit designed for exchanging internal data between the at least two electronic devices, wherein:
a first electronic communication unit of the electronic communication units comprises a receiver unit configured to receive external data from an external computer unit, wherein the external data comprise license-related data for the at least two electronic devices;
the first electronic communication unit or a second electronic communication unit of the electronic communication units comprises an arithmetic unit with an algorithm, wherein the algorithm is designed to generate configuration data based on the external data as internal data, and is designed to transmit the configuration data to at least one other electronic communication unit of the system;
the laser beam projection device comprises the first electronic communication unit and one of the laser beam receiver devices comprises the second electronic communication unit, or
one of the laser beam receiver devices comprises the first electronic communication unit and the laser beam projection device comprises the second electronic communication unit;
wherein:
at least the second electronic communication unit comprises a control unit that is designed for controlling the corresponding electronic device based on the configuration data, said controlling including at least one of activating or deactivating individually a subset of functions of the plurality of functions of the electronic device based on the configuration data,
wherein the external data are encrypted, and the arithmetic unit comprises an algorithm configured to decrypt the external data.

* * * * *